United States Patent
Campbell

(10) Patent No.: US 11,428,287 B2
(45) Date of Patent: Aug. 30, 2022

(54) HYDRAULIC BRAKE ACTUATOR PISTON ADJUSTER ASSEMBLY

(71) Applicant: GOODRICH CORPORATION, Charlotte, NC (US)

(72) Inventor: Steven C. Campbell, Tipp City, OH (US)

(73) Assignee: GOODRICH CORPORATION, Charlotte, NC (US)

(*) Notice: Subject to any disclaimer, the term of this patent is extended or adjusted under 35 U.S.C. 154(b) by 187 days.

(21) Appl. No.: 16/399,449

(22) Filed: Apr. 30, 2019

(65) Prior Publication Data

US 2020/0347900 A1    Nov. 5, 2020

(51) Int. Cl.
*F16D 66/02*    (2006.01)
*F16D 65/54*    (2006.01)
*F16D 65/18*    (2006.01)

(52) U.S. Cl.
CPC .......... *F16D 66/025* (2013.01); *F16D 65/18* (2013.01); *F16D 65/543* (2013.01)

(58) Field of Classification Search
CPC ........ F16D 65/18; F16D 65/543; F16D 66/02; F16D 66/025
See application file for complete search history.

(56) References Cited

U.S. PATENT DOCUMENTS

| | | | |
|---|---|---|---|
| 3,138,406 A * | 6/1964 | Chamberlain | B60B 3/087 301/6.1 |
| 3,403,755 A | 10/1968 | Barrett et al. | |
| 3,729,072 A * | 4/1973 | Borkowski | F16D 65/543 188/196 P |
| 3,844,388 A | 10/1974 | Ditlinger et al. | |
| 4,433,758 A * | 2/1984 | Crossman | F16D 65/543 188/196 R |
| 5,219,046 A * | 6/1993 | Clark | F16D 55/40 188/196 P |
| 5,542,504 A | 8/1996 | Berwanger | |
| 6,016,892 A | 1/2000 | Berwanger | |
| 6,234,279 B1 | 5/2001 | Jankowski et al. | |
| 2006/0175897 A1* | 8/2006 | Ether | B60T 13/741 303/138 |
| 2016/0169309 A1* | 6/2016 | Robin | B64C 25/44 188/71.8 |
| 2016/0176518 A1 | 6/2016 | Eyanga et al. | |

FOREIGN PATENT DOCUMENTS

| | | | |
|---|---|---|---|
| JP | 2001104088 A * | 4/2001 | |
| JP | 2014140892 A * | 8/2014 | B01D 39/20 |
| WO | 9605446 | 2/1996 | |

OTHER PUBLICATIONS

European Patent Office, European Search Report dated Jun. 8, 2020 in Application No. 19213545.7.
European Patent Office, European Office Action dated Aug. 18, 2021 in Application No. 19213545.7.

* cited by examiner

*Primary Examiner* — Melody M Burch
(74) *Attorney, Agent, or Firm* — Snell & Wilmer L.L.P.

(57) ABSTRACT

A brake actuator assembly may comprise a housing, a piston disposed in the housing and slidably engaged therewith, a resilient member disposed within the housing and coupled to the piston, and a deformable member disposed within the housing a coupled to the piston, wherein each of the deformable member and the resilient member are disposed radially between a piston rod of the piston and the housing.

16 Claims, 5 Drawing Sheets

HYDRAULIC BRAKE ACTUATOR PISTON ADJUSTER ASSEMBLY

FIELD

The disclosure relates generally to aircraft brake systems and aircraft brake actuation systems.

BACKGROUND

Aircraft often include one or more landing gear that comprise one or more wheels. A braking system may typically be coupled to the wheel(s) in order to decelerate or park the aircraft. Aircraft braking may induce wear in brake assembly friction stacks which may tend to increase actuator piston standoff distance. Aircraft brake actuator pistons may tend to benefit of adjustment to maintain the piston standoff distance from the friction stack.

SUMMARY

In various embodiments the present disclosure provides a brake actuator assembly comprising a housing, a hydraulic piston disposed in the housing and slidably engaged therewith, a resilient member disposed within the housing and coupled to the piston, and a deformable member disposed within the housing a coupled to the piston, wherein each of the deformable member and the resilient member are disposed radially between a piston rod of the piston and the housing.

In various embodiments, the resilient member and the deformable member are coupled via a thrust washer. In various embodiments, the thrust washer is slidably engaged to the piston rod. In various embodiments, the deformable member comprises one of a steel, a stainless steel, a tungsten carbide, a titanium, a titanium alloy, a nickel, nickel alloy, a nickel steel, a silicate, aluminum alloy, or a ceramic. In various embodiments, the deformable member comprises a porous metallic material having a porous structure. In various embodiments, the porous metallic material is configured to undergo a permanent deformation characterized by a localized collapsing of the porous structure of the porous metallic material proximate a loaded face of the deformable member. In various embodiments, the deformable member comprises a tubular structure. In various embodiments, the deformable member is configured to undergo a permanent deformation in response to applying a brake pressure to the piston. In various embodiments, the deformable member comprises a corrugated structure. In various embodiments, the resilient member comprises a Bellville spring.

In various embodiments the present disclosure provides a brake assembly for mounting on an axle comprising a friction stack, a wheel comprising a hub coupled to the axle, a torque bar configured to engage with the wheel and rotate a brake rotor of the friction stack, and an actuator assembly configured to apply a brake pressure to the brake friction stack, comprising a housing, a hydraulic piston disposed in the housing and slidably engaged therewith, a resilient member disposed within the housing and coupled to the piston, and a deformable member disposed within the housing a coupled to the piston, wherein each of the deformable member and the resilient member are disposed radially between a piston rod of the piston and the housing.

In various embodiments, the resilient member and the deformable member are coupled via a thrust washer. In various embodiments, the thrust washer is slidably engaged to the piston rod. In various embodiments, the deformable member comprises one of a steel, a stainless steel, a tungsten carbide, a titanium, a titanium alloy, a nickel, nickel alloy, a nickel steel, a silicate, aluminum alloy, or a ceramic. In various embodiments, the deformable member comprises a porous metallic material having a porous structure. In various embodiments, the porous metallic material is configured to undergo a permanent deformation characterized by a localized collapsing of the porous structure of the porous metallic material proximate a loaded face of the deformable member. In various embodiments, the deformable member comprises a tubular structure. In various embodiments, the deformable member is configured to undergo a permanent deformation in response to applying the brake pressure to the piston. In various embodiments, the permanent deformation is configured to maintain an actuator piston clearance between the friction stack and the piston at a desired actuator piston clearance in response to applying the brake pressure.

In various embodiments, the present disclosure provides a method of dynamically adjusting an actuator piston clearance comprising disposing a piston within a housing, coupling a deformable member to the piston radially between a piston rod and the housing, coupling a resilient member to the deformable member, and permanently deforming the deformable member in response to applying a brake pressure to the piston.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
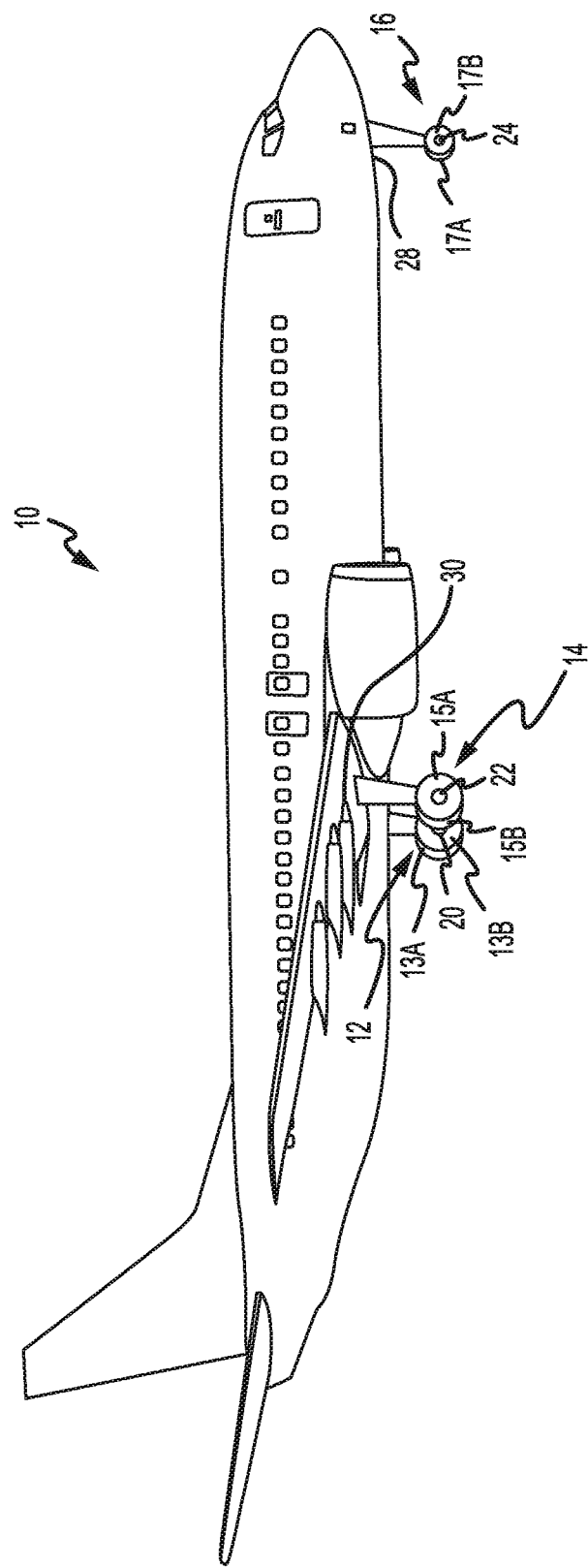
FIG. 1A illustrates an aircraft having a wheel and brake system comprising an actuator assembly, in accordance with various embodiments.

Referring now to FIG. 1A, in accordance with various embodiments, an aircraft 10 includes landing gear, such as a left main landing gear 12, a right main landing gear 14, and nose landing gear 16. The left main landing gear 12, right main landing gear 14, and nose landing gear 16 typically support the aircraft 10 when the aircraft 10 is not flying, thereby allowing the aircraft 10 to taxi, take off, and land without damage. In various embodiments, the left main landing gear 12 includes a first wheel 13A and a second wheel 13B coupled by an axle 20. In various embodiments, the right main landing gear 14 includes a first wheel 15A and a second wheel 15B coupled by an axle 22. In various embodiments, the nose landing gear 16 includes a first nose wheel 17A and a second nose wheel 17B coupled by an axle 24. In various embodiments, the aircraft 10 comprises any number of landing gear(s), and each landing gear comprises any number of wheels. In various embodiments, the left main landing gear 12, right main landing gear 14, and nose landing gear 16 are retracted when the aircraft 10 is in flight. In various embodiments, one or more of the left main landing gear 12, right main landing gear 14, and nose landing gear 16 extends from an underside of a fuselage 28 of the aircraft 10, or from an underside of the wings 30 thereof.

Figure 1B:
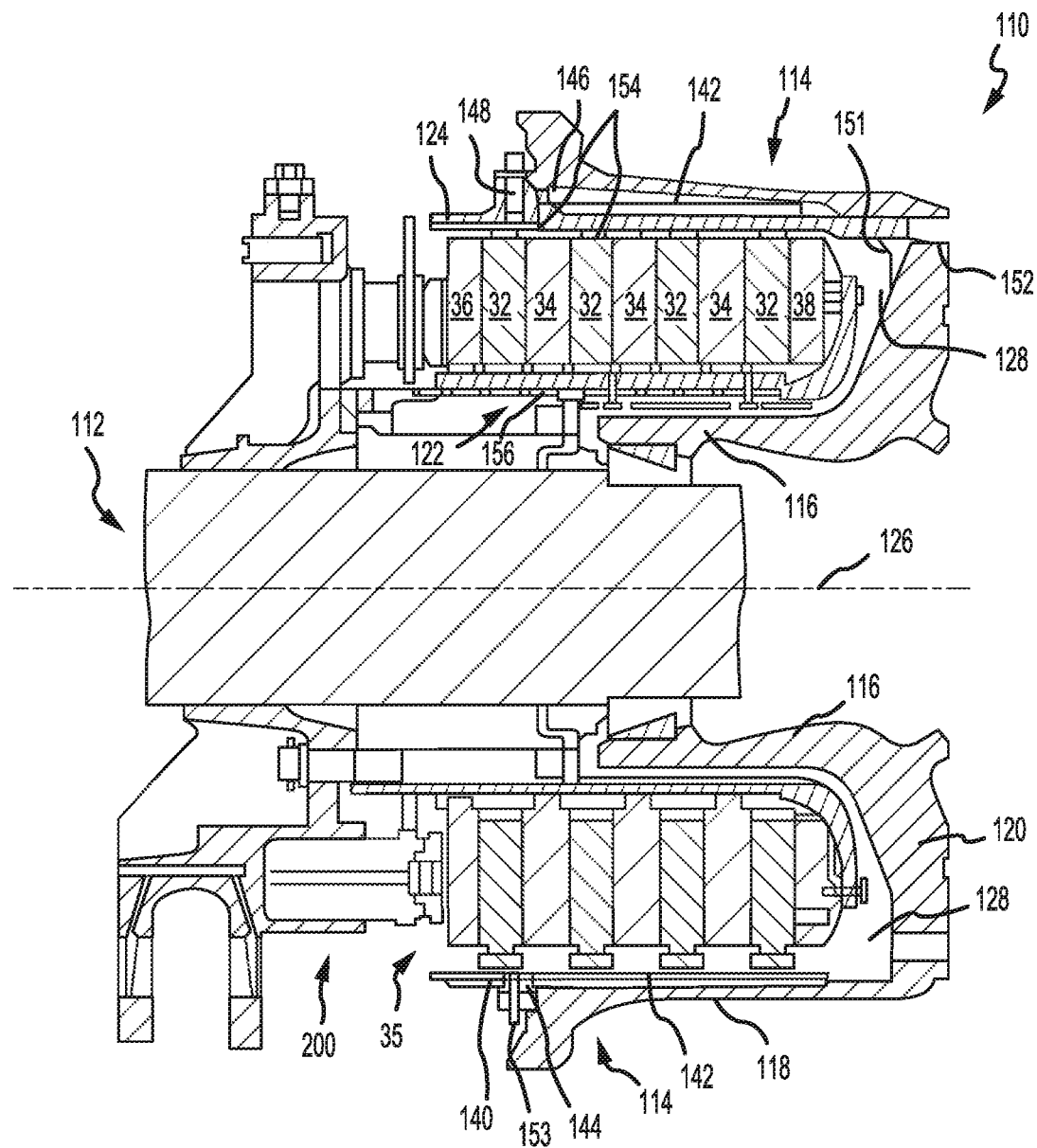
FIG. 1B illustrates a wheel and brake assembly for mounting on an axle comprising an actuator assembly, in accordance with various embodiments.

In various embodiments, the aircraft 10 also includes a brake system that is applied to one or more of the wheels 13A, 13B, 15A, 15B, 17A, 17B of one or more of the respective left main landing gear 12, right main landing gear 14, and/or nose landing gear 16. Referring now to FIG. 1B, a wheel and brake assembly for mounting on an axle 110 comprising an actuator assembly 200 is located on the aircraft 10 of FIG. 1-A, in accordance with various embodiments. The wheel and brake assembly for mounting on an axle 110 typically comprises an axle 112, a wheel 114 (e.g., the wheels 13A, 13B, 15A, 15B, 17A, 17B of FIG. 1-A) including a hub 116 and wheel well 118, a web 120, a torque take-out assembly 122, one or more torque bars 124, a wheel rotational axis 126, a wheel well recess 128, the actuator assembly 200, multiple brake rotors 32, multiple brake stators 34, a pressure plate 36, an end plate 38, a heat shield 140 which may have sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., the interleaved brake rotors 32 and brake stators 34) comprise a friction stack 35 disposed in the wheel well recess 128 of the wheel well 118. The brake rotors 32 are typically engaged to the torque bars 124 for rotating with the wheel 114, while the brake stators 34 are typically engaged with the torque take-out assembly 122. At least one actuator assembly 200 is typically operable to compress the interleaved brake rotors 32 and brake stators 34 for stopping the aircraft 10 of FIG. 1A. In the embodiment of FIG. 1B, the actuator assembly 200 is shown as comprising a hydraulically actuated piston. The pressure plate 36 and end plate 38 are disposed at opposite ends of the interleaved brake rotors 32 and brake stators 34.

Through compression of the brake rotors 32 and brake stators 34 between the pressure plate 36 and end plate 38, the resulting frictional contact slows, stops, and/or prevents rotation of the wheel 114. The torque take-out assembly 122 is typically secured to a stationary portion of a landing gear such that the torque take-out assembly 122 and brake stators 34 are prevented from rotating during braking of the aircraft 10 of FIG. 1A. The brake rotors 32 and brake stators 34 are typically fabricated from various materials, such as, for example carbon materials. The brake disks typically withstand and dissipate the heat generated from friction between the brake disks while braking the aircraft 10 of FIG. 1A. The frictional contact tends to heat the rotors and stators in excess of 1000° F. [538° C.].

Figure 2A:
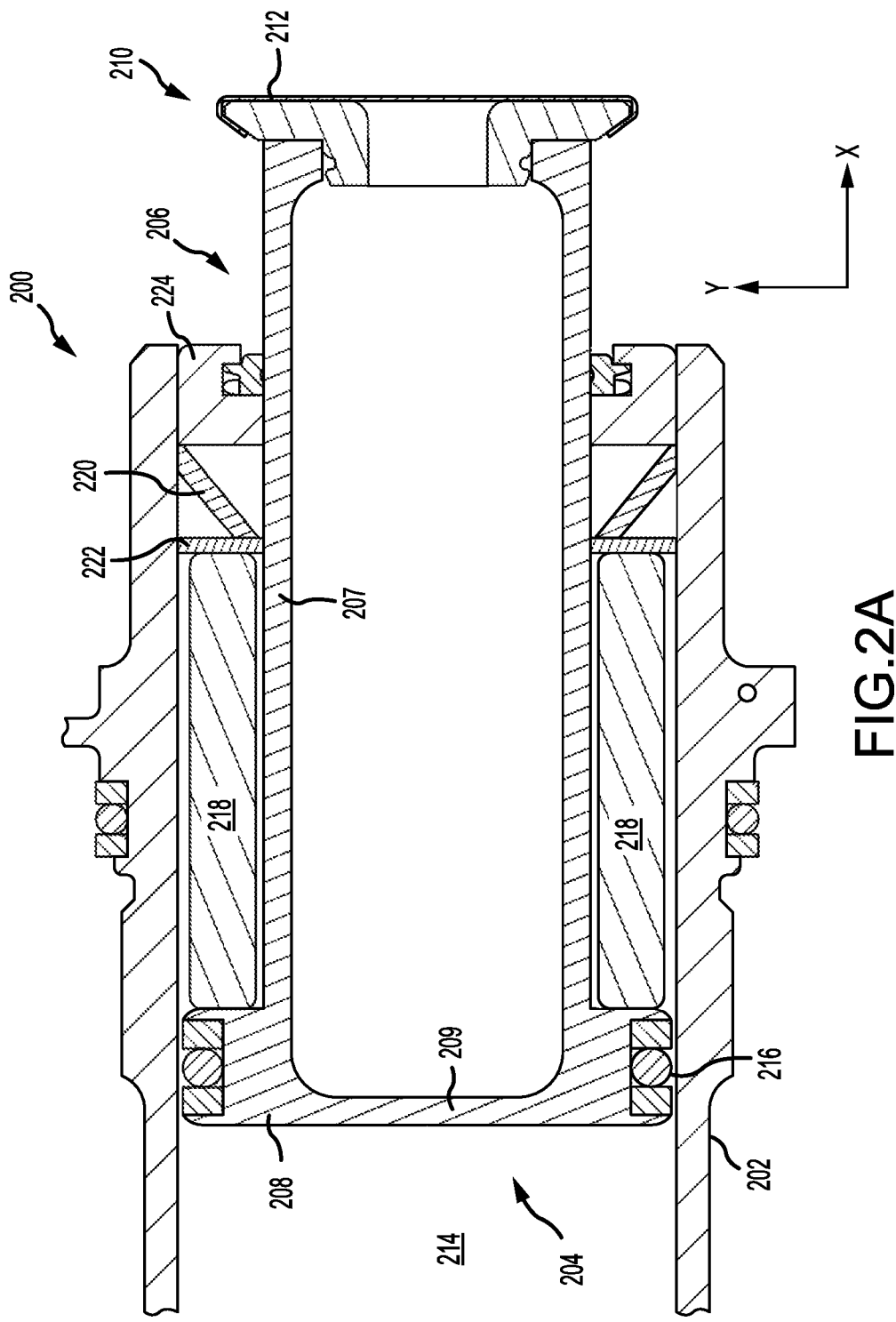
FIG. 2A illustrates an actuator assembly, in accordance with various embodiments.
Figure 2B:
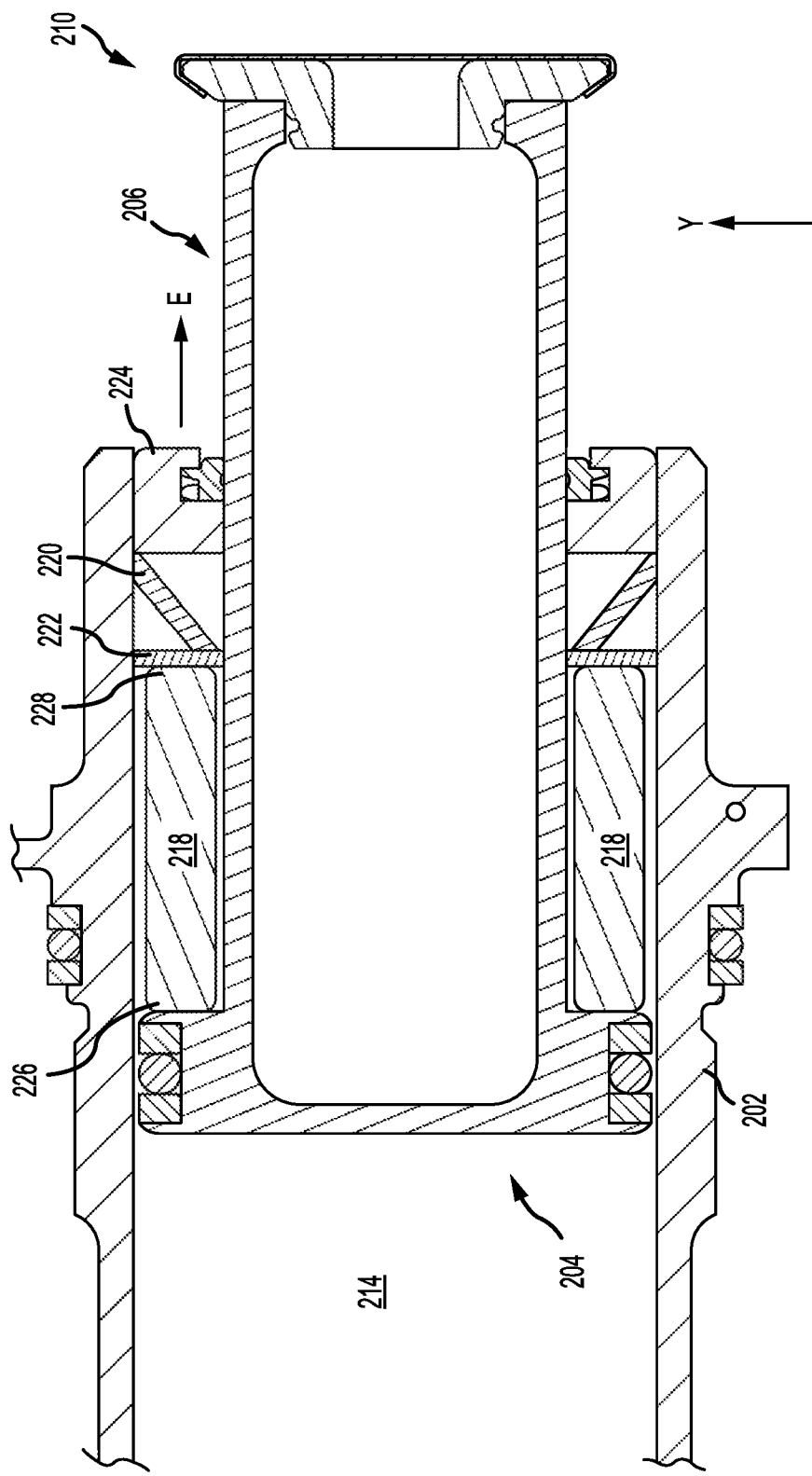
FIG. 2B illustrates an actuator assembly, in accordance with various embodiments.

According to various embodiments and with additional reference to FIGS. 2A and 2B, actuator assembly 200 is illustrated in cross section through the XY-plane. The actuator assembly 200 comprises a piston housing 202 and a piston 204 configured to translate axially (along the X-axis) within the piston housing 202 in response to hydraulic pressure. Piston 204 comprises a piston rod 206 coupled to a piston head 208. The piston rod 206 may be defined by an annular-cylindrical structure 207 extending from a base wall 209 of the piston head 208 toward a piston rod end 210 opposite the piston head 208. In various embodiments, a piston insulator 212 is coupled to the annular-cylindrical structure 207. Hydraulic fluid enters cavity 214 behind piston head 208 and is retained by a seal member 216 set into a radial surface of the piston head 208. The hydraulic fluid exerts hydraulic pressure on the piston 204, causing the piston rod end 210 to translate outward of the gland 224 of piston housing 202. In various embodiments, the hydraulic fluid may exert a brake pressure causing the piston rod end 210 to contact the piston insulator 212 with pressure plate 36. In response, the pressure plate 36 tends to compress the friction stack thereby generating heat.

Pressure plate 36 and friction stack 35 may undergo friction heating and the piston insulator 212 may tend to mitigate conductive heat transfer between the pressure plate 36 and the annular-cylindrical structure 207 of piston 204. In this regard, conductive heat transfer between the piston 204 and the hydraulic fluid may be reduced. In various embodiments and in response to the heating, friction stack 35 may tend to lose mass. For example, friction stack 35 brake rotors 32 and brake stators 34 may tend to wear at the respective contact surfaces thereby tending to decrease the overall axial length (i.e. along the wheel axle) of the friction stack 35. In this regard, multiple cycles of braking may tend to cause a gap between the pressure plate 36 the piston rod end 210 (i.e. an actuator piston clearance) to increase as the friction stack 35 wears in response to the repeated cycles of braking. Stated another way, the actuator piston clearance may increase from a desired actuator piston clearance in response to applying the brake force. In various embodiments the desired actuator piston clearance is between 0.030 in [0.762 mm] and 0.250 in [6.35 mm].

In various embodiments, actuator assembly 200 includes a deformable member 218 and a resilient member 220. The deformable member 218 may be disposed about the piston rod 206 and relatively between the piston rod 206 and the piston housing 202 and configured to contact the resilient member 220. In like regard, the resilient member 220 may be disposed about the piston rod 206 and relatively between the piston rod 206 and the piston housing 202. The resilient means may tend to bias the piston 204 relatively inward (along the X-axis) against a resting pressure of the hydraulic fluid within the cavity 214. In various embodiments, the resilient means may comprise a spring such as a coil spring, a Bellville spring, or a Bellville spring stack. In various embodiments, the resting pressure may be between 50 psi [344.738 kPa] and 500 psi [3447.38 kPa]. In various embodiments, the resilient member 220 may be configured to contact the gland 224 and thereby tend to hold the deformable member 218 in contact with the piston head 208 of the piston 204. In various embodiments, the resilient member 220 may be coupled to the deformable member 218 or may be contacted to the deformable member 218 via a thrust washer 222. The thrust washer 222 may be slidably engaged with the piston rod 206 and the piston housing 202. In like regard, the deformable member 218 and/or the resilient member 220 may be slidably engaged with the piston rod 206 and the piston housing 202.

In various embodiments and in response to applying the brake force the hydraulic fluid within the cavity 214 may increase in pressure above the resting pressure to apply the brake pressure to the piston 204. In response to the brake pressure, the bias of the resilient member may be overcome and the piston 204 may tend to translate further out of the gland 224. In response, the piston head 208 tends to force the deformable member 218 against the thrust washer 222 and resilient member 220 thereby causing a permanent deformation of the deformable member 218. In various embodiments and with particular reference to FIG. 2B, the permanent deformation of the deformable member may be primarily axial (along the X-axis) tending thereby to result in an axial shortening of the deformable member 218. In response to the axial shortening of the deformable member 218 the piston may further extend (arrow E) from the gland 224 in response to the resting pressure of the hydraulic fluid within the cavity 214. In various embodiments, the permanent deformation of the deformable member 218 may be tailored to the friction stack 35 wear in response to the repeated cycles of braking (i.e., the friction stack 35 wear rate). In this regard, the permanent deformation of the deformable member 218 may tend to maintain the actuator piston clearance (e.g., between the friction stack 35 and the piston 204) at the desired actuator piston clearance in response to applying the brake force.

In various embodiments, the deformable member 218 may comprise a relatively porous or sponge like metallic material including a plurality of pores. The permanent deformation of the deformable member 218 may be characterized by a localized collapsing of the porous structure of the porous metallic material proximate a loaded face of the deformable member (i.e. the points of contact with the piston head 208 and/or thrust washer 222). In this regard, the deformable member 218 may be constrained to deform relatively along the axis of the piston by tending to increase the sectional density of the deformable member 218 in response to collapsing pores at the permanently deformed portions 226 and/or 228. In various embodiments, the deformable member 218 may comprise a tubular structure about the piston rod 206, or may comprise a plurality of rods disposed about the piston rod 206, or may comprise a plurality of arcuate segments disposed about the piston rod 206.

Figure 3:
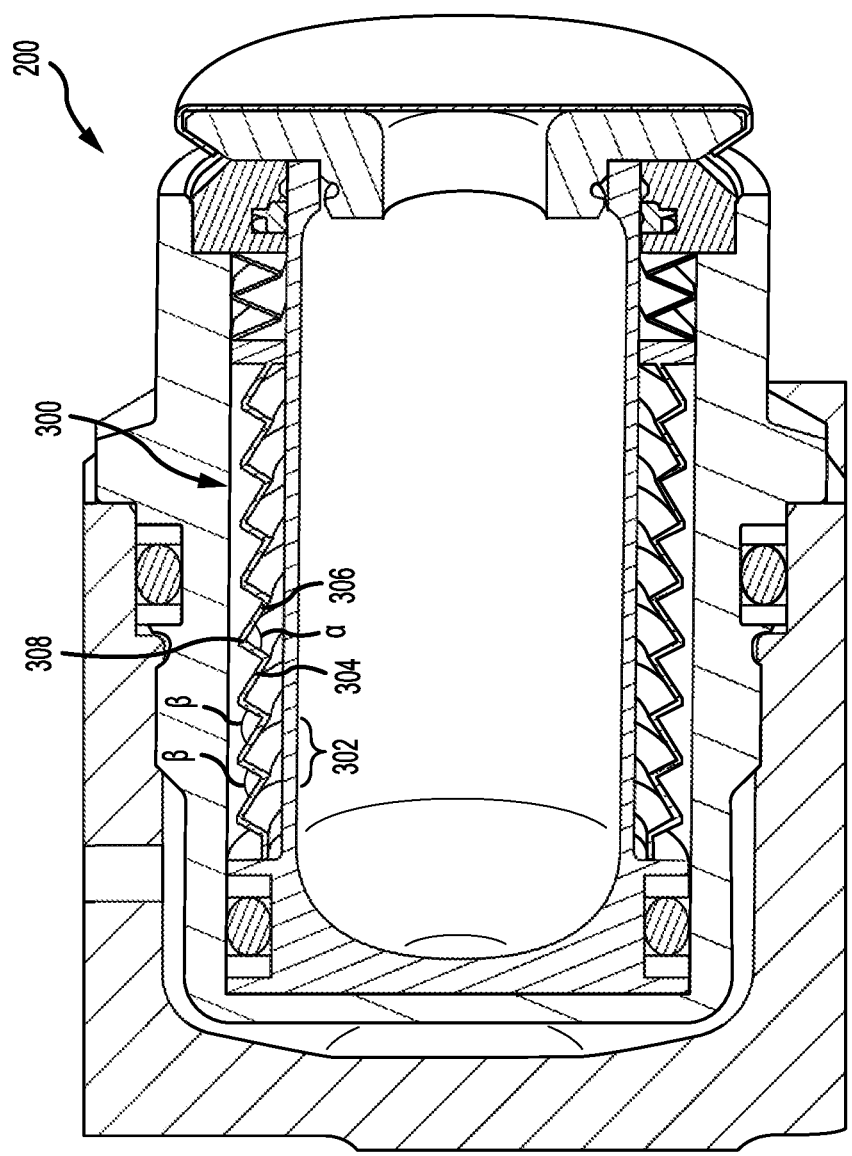
FIG. 3 illustrates an actuator assembly, in accordance with various embodiments.

In various embodiments and with additional reference to FIG. 3, actuator assembly 200 is shown including a deformable member 300. Deformable member 300 is defined by a corrugated or bellows like structure which may be formed of a metallic sheet. The structure includes a plurality of segments 302 comprising a first frustoconical portion 304 and a second frustoconical portion 306 joined at their respective bases to define a vertex 308 therebetween. The vertex 308 includes an interior angle $\alpha$ which may be between 10° and 170°. In like regard, each of the segments 302 may be couple to define an exterior angle $\beta$ therebetween. In various embodiments, the angle $\beta$ may be between 10° and 170°. In various embodiments, a deformable member (such as deformable members 218 and 300) may comprise any of a steel, a stainless steel, a tungsten carbide, a titanium, a titanium alloy, a nickel, nickel alloy, a nickel steel (e.g., an austenitic nickel-chromium-based alloy such as that available under the trade name INCONEL), a silicate, aluminum alloy, or a ceramic.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake actuator assembly, comprising:
   a housing;
   a piston disposed in the housing and slidably engaged therewith;
   a resilient member disposed within the housing and coupled to the piston; and
   a deformable member disposed within the housing and coupled to the piston, wherein the deformable member comprises a porous metallic material having a porous structure, and wherein each of the deformable member and the resilient member are disposed radially between a piston rod of the piston and the housing,
   wherein the deformable member and the resilient member are located axially between a gland of the housing and a piston head of the piston, wherein the resilient member directly contacts the gland of the housing and the deformable member directly contacts the piston head of the piston,
   wherein the porous metallic material undergoes a permanent deformation characterized by a localized collapsing of the porous structure of the porous metallic material proximate a loaded face of the deformable member in response to contact between the loaded face and at least one of the piston head or the resilient member.

2. The brake actuator assembly of claim 1, wherein the resilient member and the deformable member are coupled via a thrust washer.

3. The brake actuator assembly of claim 2, wherein the thrust washer is slidably engaged to the piston rod.

4. The brake actuator assembly of claim 1, wherein the deformable member comprises one of a steel, a stainless steel, a tungsten carbide, a titanium, a titanium alloy, a nickel, nickel alloy, a nickel steel, a silicate, an aluminum alloy, or a ceramic.

5. The brake actuator assembly of claim 1, wherein the deformable member comprises a tubular structure.

6. The brake actuator assembly of claim 1, wherein the deformable member is configured to undergo the permanent deformation in response to applying a brake pressure to the piston.

7. The brake actuator assembly of claim 1, wherein the deformable member comprises a corrugated structure.

8. The brake actuator assembly of claim 1, wherein the resilient member comprises a Bellville spring.

9. A wheel and brake assembly for mounting on an axle, comprising:
   a friction stack;
   a wheel comprising a hub coupled to the axle;
   a torque bar configured to engage with the wheel and rotate a brake rotor of the friction stack; and
   an actuator assembly configured to apply a brake pressure to the friction stack, the actuator assembly comprising:
      a housing;
      a piston disposed in the housing and slidably engaged therewith;
      a resilient member disposed within the housing and coupled to the piston; and
      a deformable member disposed within the housing and coupled to the piston, wherein the deformable member comprises a porous metallic material having a porous structure, and wherein each of the deformable member and the resilient member are disposed radially between a piston rod of the piston and the housing,
   wherein the deformable member and the resilient member are located axially between a gland of the housing and a piston head of the piston, wherein the resilient member contacts the gland and the deformable member contacts the piston head,
   wherein the porous metallic material undergoes a permanent deformation characterized by a localized collapsing of the porous structure of the porous metallic material proximate a loaded face of the deformable member in response to contact between the loaded face and at least one of the piston head or the resilient member.

10. The wheel and brake assembly of claim 9, wherein the resilient member and the deformable member are coupled via a thrust washer.

11. The wheel and brake assembly of claim 10, wherein the thrust washer is slidably engaged to the piston rod.

12. The wheel and brake assembly of claim 9, wherein the deformable member comprises one of a steel, a stainless steel, a tungsten carbide, a titanium, a titanium alloy, a nickel, nickel alloy, a nickel steel, a silicate, an aluminum alloy, or a ceramic.

13. The wheel and brake assembly of claim 9, wherein the deformable member comprises a tubular structure.

14. The wheel and brake assembly of claim 9, wherein the deformable member is configured to undergo the permanent deformation in response to applying the brake pressure to the piston.

15. The wheel and brake assembly of claim 14, wherein the permanent deformation is configured to maintain an actuator piston clearance between the friction stack and the piston at a desired actuator piston clearance in response to applying the brake pressure.

16. A method of dynamically adjusting an actuator piston clearance, the method comprising:
   disposing a piston within a housing, the piston being slidably engaged with the housing;
   disposing a deformable member in the housing, wherein the deformable member comprises a porous metallic material having a porous structure, wherein the deformable member is located radially between a piston rod of the piston and the housing;
   disposing a resilient member within the housing;
   coupling the resilient member to the deformable member, wherein the resilient member is disposed radially between the piston rod and the housing; and
   permanently deforming the deformable member in response to applying a brake pressure to the piston,
   wherein the deformable member and the resilient member are located axially between a gland of the housing and a piston head of the piston, wherein the resilient member contacts the gland and the deformable member contacts the piston head of the piston,
   wherein the porous metallic material undergoes a permanent deformation characterized by a localized collapsing of the porous structure of the porous metallic material proximate a loaded face of the deformable member in response to contact between the loaded face and at least one of the piston head or the resilient member.

* * * * *